(12) United States Patent
McCluskey et al.

(10) Patent No.: US 11,085,563 B2
(45) Date of Patent: Aug. 10, 2021

(54) SYSTEM AND METHOD FOR A SELF-ALIGNING DUCT

(71) Applicant: THE BOEING COMPANY, Chicago, IL (US)

(72) Inventors: Neal J. McCluskey, Poulsbo, WA (US); Jean-Michel Fouard, Marysville, WA (US); James Frederick Stein, Edmonds, WA (US); Kyle Anthony Miller, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 201 days.

(21) Appl. No.: 16/228,016

(22) Filed: Dec. 20, 2018

(65) Prior Publication Data

US 2020/0200308 A1    Jun. 25, 2020

(51) Int. Cl.
*F16L 13/02* (2006.01)
*F16L 23/08* (2006.01)
*B64D 13/00* (2006.01)

(52) U.S. Cl.
CPC ............ *F16L 23/08* (2013.01); *F16L 13/02* (2013.01); *B64D 13/00* (2013.01)

(58) Field of Classification Search
CPC .......... F16L 13/02; F16L 23/08; B64D 13/00
USPC ..................................................... 285/367
See application file for complete search history.

(56) References Cited

U.S. PATENT DOCUMENTS

| | | | | |
|---|---|---|---|---|
| 2,703,722 A | * | 3/1955 | Christophersen | F16L 23/20 285/340 |
| 2,761,707 A | * | 9/1956 | Dale | F16L 23/10 285/367 |
| 2,834,087 A | * | 5/1958 | Dale | F16L 23/10 24/279 |
| 2,842,385 A | * | 7/1958 | Webster | F16L 23/10 285/408 |
| 3,180,662 A | * | 4/1965 | Parlasca | F16L 23/10 285/95 |
| 3,455,582 A | * | 7/1969 | Hoevel | F16L 23/10 285/302 |
| 4,185,858 A | * | 1/1980 | Peash | F16L 23/10 285/367 |
| 5,236,227 A | | 8/1993 | Adams et al. | |
| 5,538,293 A | | 7/1996 | Kolt | |
| 6,168,230 B1 | | 1/2001 | Ono | |
| 6,231,704 B1 | | 5/2001 | Carpinetti | |

* cited by examiner

*Primary Examiner* — Matthew Troutman
*Assistant Examiner* — James A Linford
(74) *Attorney, Agent, or Firm* — Armstrong Teasdale LLP (57) ABSTRACT

A duct manifold including a first duct, a second duct, and a coupling. The first duct includes a first duct body, a duct extension, and a first duct flange. The duct extension extends from the first duct body. The first duct flange is coupled to the duct extension, and the duct extension extends beyond the first duct flange such that a flange support is defined on an end of the duct extension. The second duct including a second duct body and a second duct flange coupled to the second duct body. The coupling is configured to couple the first duct to the second duct, wherein the second duct flange rests on the flange support when the coupling couples the first duct to the second duct.

16 Claims, 5 Drawing Sheets

SYSTEM AND METHOD FOR A SELF-ALIGNING DUCT

FIELD

The field of the disclosure relates generally to fluid flow conduits and, more specifically, to a system and method for a self-aligning duct.

BACKGROUND

At least some known aircraft include ducts to channel fluid, typically hot air, to a plurality of locations within the aircraft. For example, the aircraft typically includes an air system that channels higher temperature, higher pressure air throughout the aircraft. For example, the air system may be configured to channel higher temperature, higher pressure air to at least the wings, the fuselage, and/or the landing gear of the aircraft. The air system includes a plurality of duct manifolds configured to channel the higher temperature, higher pressure air. Because of tight spaces and close confines within the aircraft, the duct manifolds are typically broken into sections and installed manually into the wing. Additionally, because the duct manifold channels higher temperature, higher pressure air, a duct joint couples two sections of duct together to form a sealed duct manifold capable of channeling the higher temperature, higher pressure air. The duct joint is typically two sheet metal duct flanges with a V-band coupling.

The sheet metal duct flanges are typically coupled to an end of the ducts. During construction of the duct manifold, the sheet metal duct flanges are manually aligned by an installer. The V-band coupling is then placed over the aligned sheet metal duct flanges and tightened until the sheet metal duct flanges form a sealed duct joint. Constructing the duct manifold is difficult for a single installer because the installer must align two duct segments while simultaneously placing the V-band coupling over the aligned sheet metal duct flanges and tightening the V-band coupling. While a second installer can help with the construction of the duct manifold, the tight spaces and close confines within the aircraft make it difficult for the second installer to assist with the construction operation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of the present disclosure includes a duct manifold including a first duct, a second duct, and a coupling. The first duct includes a first duct body, a duct extension, and a first duct flange. The duct extension extends from the first duct body. The first duct flange is coupled to the duct extension, and the duct extension extends beyond the first duct flange such that a flange support is defined on an end of the duct extension. The second duct including a second duct body and a second duct flange coupled to the second duct body. The coupling is configured to couple the first duct to the second duct, wherein the second duct flange rests on the flange support when the coupling couples the first duct to the second duct.

Another aspect of the present disclosure includes a duct including a duct body, a duct extension, and a duct flange. The duct extension extends from the duct body. The duct flange is coupled to the duct extension, and the duct extension extends beyond the duct flange such that a flange support is defined on an end of the duct extension.

Yet another aspect of the present disclosure includes a method of constructing a duct manifold. The method includes providing a first duct including a first duct body, a duct extension extending from the first duct body, and a first duct flange coupled to the duct extension. The duct extension extends beyond the first duct flange such that a flange support is defined on an end of the duct extension. The method also includes aligning a second duct with the first duct. The second duct includes a second duct body and a second duct flange coupled to the second duct body. The second duct is aligned with the first duct such that the second duct flange rests on the flange support. The method further includes coupling the first duct to the second duct with a coupling.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of the systems and methods described herein include a duct manifold including a first duct and a second duct coupled together by a coupling. The first duct includes a first duct extension and a first duct flange coupled to the first duct extension. The first duct extension extends beyond the first duct flange such that a flange support is defined on the first duct extension. The second duct includes a second duct flange coupled to the second duct. The first and second duct flanges each include a skirt and an apex. The skirt is a flat metal portion, and the apex is a curved metal portion coupled to an end of the skirt. The curved metal shape of the apex forms a first flat seal portion on the first duct flange and a second flat seal portion on the second duct flange. During installation, a single installer rests the second flat seal portion on the first duct extension such that the first and second flat seal portions are pressed against each other. Resting the second duct flange on the flange support allows the installer to install the duct manifold in tight spaces and close confines within a vehicle. Specifically, resting the second duct flange on the flange support allows the installer to align the first duct and the second duct, and allows the aligned first and second ducts to rest in place while the installer places the coupling around the first and second ducts. The installer's hands are then free to tighten the coupling, creating an air tight seal around the first and second ducts. As such, the structure and configuration of the first and second ducts properly aligns the first and second ducts and frees an installer's hands such that the installer can complete the entire installation process alone.

Figure 1:
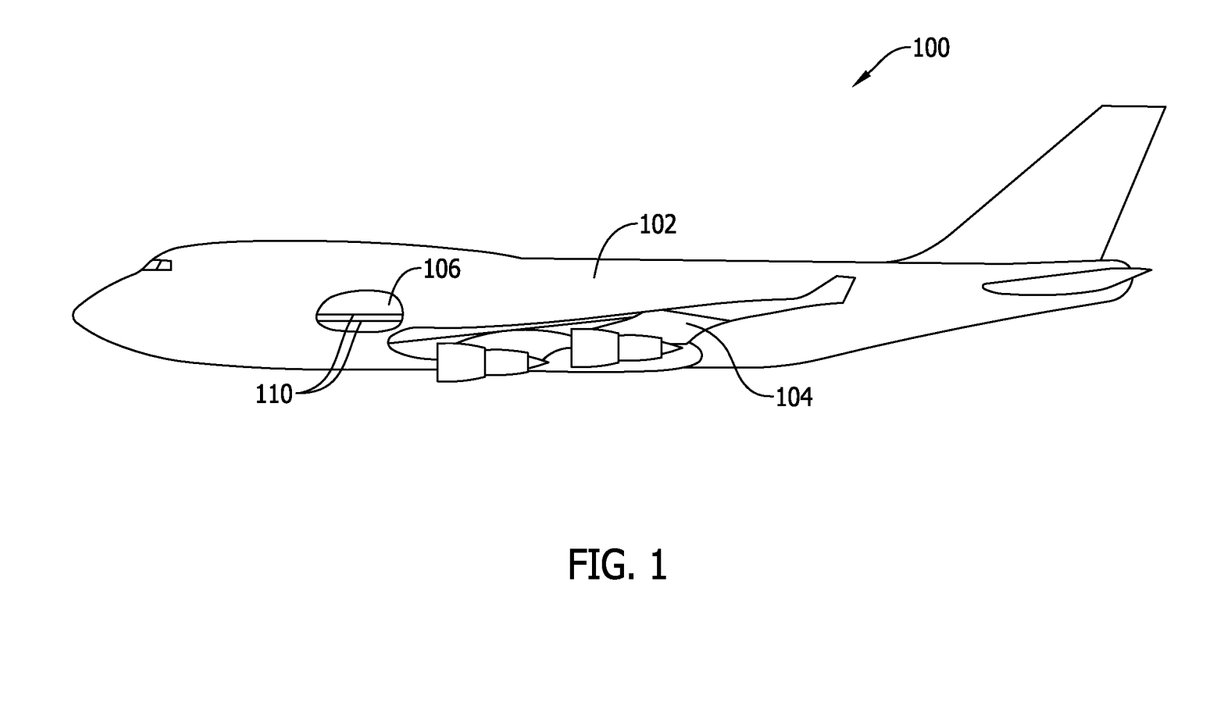
FIG. 1 is a side view illustration of an exemplary vehicle.

FIG. 1 is a side view illustration of a vehicle 100. Vehicle 100 is an aircraft that includes a fuselage 102 and a wing structure 104 extending from fuselage 102. Fuselage 102 and/or wing structure 104 define an interior volume 106, and a plurality of duct manifolds 108 positioned within interior volume 106. Specifically, duct manifolds 108 are configured to channel at least one fluid through interior volume 106 to different parts of vehicle 100.

Figure 2:
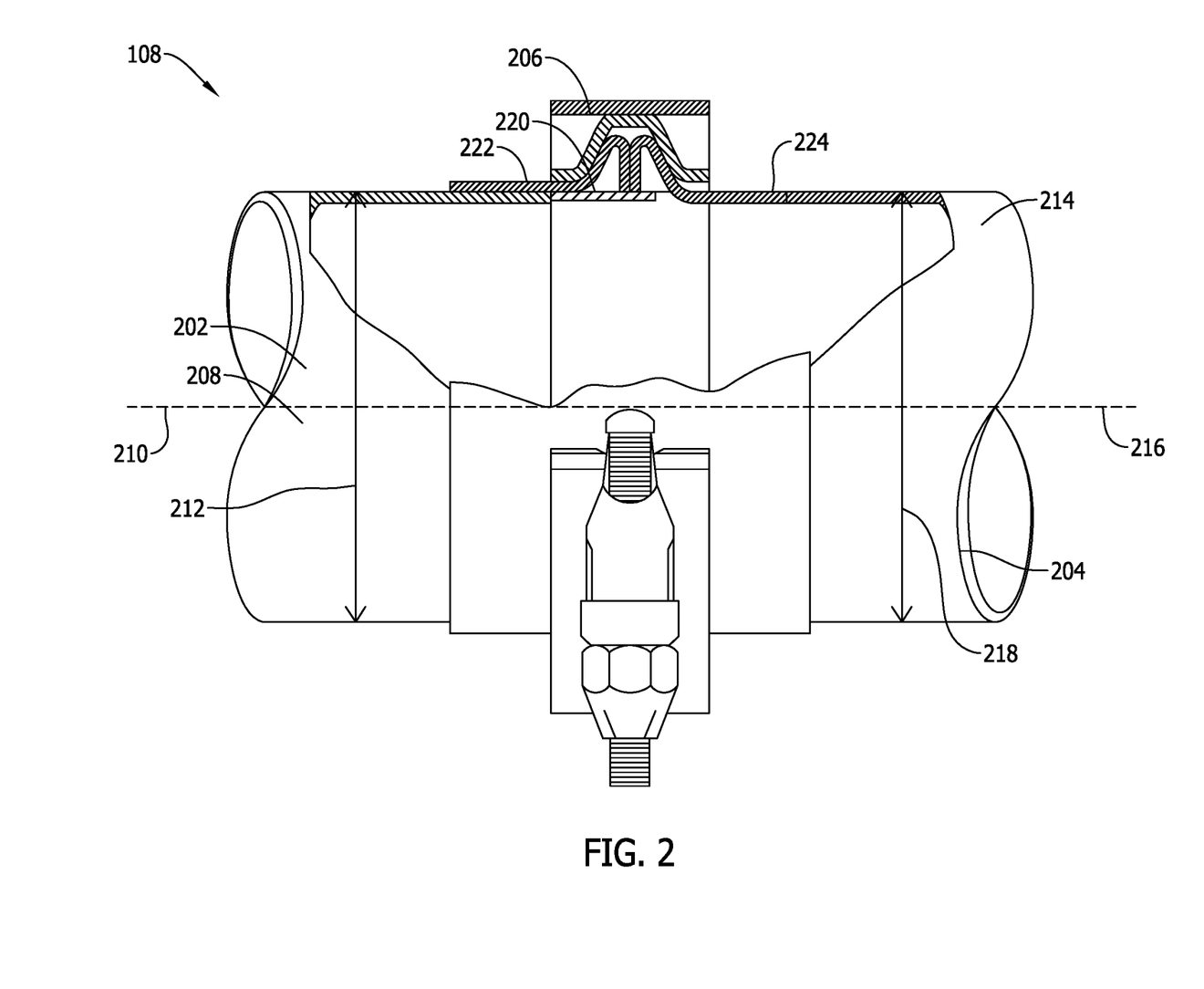
FIG. 2 is a perspective view of an example duct manifold for use in the vehicle shown in FIG. 1.

FIG. 2 is a partial cut away side view of duct manifold 108 for use with vehicle 100. Duct manifold 108 includes a first duct 202, a second duct 204, and a coupling 206. As shown in FIG. 2, first duct 202 and second duct 204 are cylindrical conduits configured to channel a flow of fluid through vehicle 100. In the example implementation, duct manifold 108 is configured to channel a flow of high temperature, high pressure air to wing structure 104. In alternative implementations, duct manifold 108 is configured to channel any fluid that enables vehicle 100 to operate as described herein, and first duct 202 and second duct 204 have any shape that enables vehicle 100 to operate as described herein. Moreover, duct manifold 108 described herein is configured to be located in any location within vehicle 100 where coupling 206 is used to couple first duct 202 to second duct 204. For example, duct manifold 108 may be located within wing structure 104, fuselage 102, and/or any other location within vehicle 100.

In the example implementation, first duct 202 includes a first duct body 208 which defines a first center line 210 and a first duct diameter 212, and second duct 204 includes a second duct body 214 which defines a second center line 216 and a second duct diameter 218. In the exemplary implementation, first duct diameter 212 and second duct diameter 218 are substantially equal. In order to ensure that the flow of high temperature, high pressure air is channeled to wing structure 104 without leaking, first center line 210 and second center line 216 must be aligned such that duct manifold 108 is substantially air tight. To ensure the alignment of first center line 210 and second center line 216, first duct 202 includes a first duct extension 220 coupled to a first duct flange 222, and second duct 204 includes a second duct flange 224 coupled to second duct body 214. First duct extension 220, first duct flange 222, and second duct flange 224 are configured to align first center line 210 and second center line 216 during installation of duct manifold 108. Coupling 206 is configured to couple first duct 202 to second duct 204 such that first center line 210 and second center line 216 are aligned.

Figure 3:
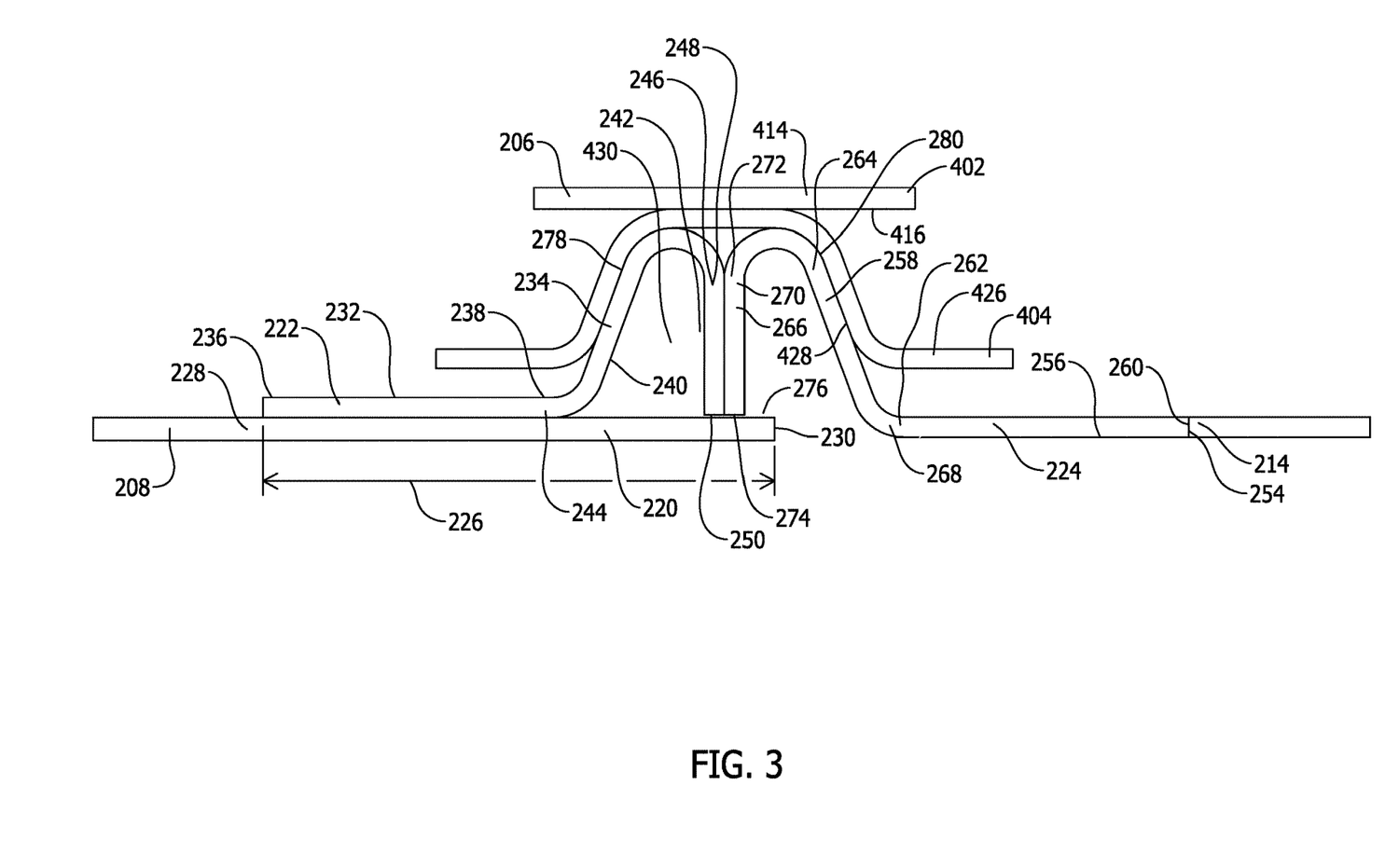
FIG. 3 is a schematic cut away view of a portion of the duct manifold shown in FIG. 2.

FIG. 3 is a schematic cut away view of a portion of duct manifold 108 showing first duct extension 220, first duct flange 222, second duct flange 224, and coupling 206. As shown in FIG. 3, first duct extension 220 extends from first duct body 208 a first duct extension distance 226, and first duct flange 222 is coupled to first duct extension 220. Specifically, a first end 228 of first duct extension 220 is coupled to first duct body 208 such that a second end 230 of first duct extension 220 extends first duct extension distance 226 from first duct body 208. First duct extension 220, first duct flange 222, and second duct flange 224 are positioned such that such that first center line 210 and second center line 216 are aligned during installation of duct manifold 108.

First duct flange 222 includes a first skirt 232 and a first apex 234. First skirt 232 includes a first end 236 and a second end 238 and has a flat profile. First skirt 232 is coupled to first duct extension 220 such that first end 236 of first skirt 232 is positioned proximate first end 228 of first duct extension 220, and second end 238 is positioned proximate second end 230 of first duct extension 220. First apex 234 includes a first curved portion 240 and a first flat seal portion 242. First curved portion 240 includes a first end 244 and a second end 246, and first flat seal portion 242 includes a first end 248 and a second end 250. First curved portion 240 has a curved profile such that first end 244 of first curved portion 240 is oriented substantially parallel to first skirt 232, and second end 250 of first curved portion 240 is oriented substantially perpendicular to first skirt 232. First flat seal portion 242 has a flat profile and is coupled to first curved portion 240 such that first flat seal portion 242 is oriented substantially perpendicular to first skirt 232. Specifically, first end 244 of first curved portion 240 is coupled to second end 238 of first skirt 232, and second end 246 of first curved portion 240 is coupled to first end 248 of first flat seal portion 242.

Second duct flange 224 has a structure that is substantially similar to first duct flange 222 except second duct flange 224 is coupled to an end 254 of second duct body 214 rather than first duct extension 220. Second duct flange 224 includes a second skirt 256 and a second apex 258. Second skirt 256 includes a first end 260 and a second end 262 and has a flat profile. Second skirt 256 is coupled to end 254 of second duct body 214 such that second duct flange 224 extends from second duct 204. Second apex 258 includes a second curved portion 264 and a second flat seal portion 266. Second curved portion 264 includes a first end 268 and a second end 270, and second flat seal portion 266 includes a first end 272 and a second end 274. Second curved portion 264 has a curved profile such that first end 268 of second curved portion 264 is oriented substantially parallel to second skirt 256, and second end 274 of second curved portion 264 is oriented substantially perpendicular to second skirt 256. Second flat seal portion 266 has a flat profile and is coupled to second curved portion 264 such that second flat seal portion 266 is oriented substantially perpendicular to second skirt 256. Specifically, first end 268 of second curved portion 264 is coupled to second end 262 of second skirt 256, and second end 270 of second curved portion 264 is coupled to first end 272 of second flat seal portion 266.

In the illustrated implementation, first skirt 232 is joined or fused (e.g., welding, bonding, fusing) to first duct extension 220, and second skirt 256 is also joined or fused (e.g., welding, bonding, fusing) to end 254 of second duct body 214. Specifically, first skirt 232 is seam welded to first duct extension 220, and second skirt 256 is butt welded to end 254 of second duct body 214. However, first skirt 232 may be coupled to first duct extension 220 using any coupling device or coupling method that permanently bonds first skirt 232 to first duct extension 220 such that an airtight seal with sufficient strength to contain a flow of fluid within duct manifold 108 is created between first skirt 232 and first duct extension 220. Similarly, second skirt 256 may be coupled to end 254 of second duct body 214 using any coupling device or coupling method that permanently bonds second skirt 256 to second duct body 214 such that an airtight seal with sufficient strength to contain a flow of fluid within duct manifold 108 is created between second skirt 256 and second duct body 214.

In the illustrated implementation, the different positions of first duct flange 222 and second duct flange 224 on first duct body 208 and second duct body 214 respectively, cause first duct 202 to have a different structure than second duct 204. Specifically, first duct flange 222 is coupled to first duct extension 220 such that first duct extension 220 extends beyond first duct flange 222 such that a flange support 276 is defined on second end 230 of first duct extension 220. Flange support 276 is configured to allow an installer to align first duct 202 and second duct 204. Specifically, second end 274 of second flat seal portion 266 is configured to rest on flange support 276 during installation. Placing second end 274 of second flat seal portion 266 on flange support 276 ensures that first duct 202 and second duct 204 are aligned such that an air tight seal is created.

First flat seal portion 242 and second flat seal portion 266 are configured to create an airtight seal. Specifically, first flat seal portion 242 is configured to press against second flat seal portion 266 when first duct 202 and second duct 204 are joined together. The curved profile of first curved portion 240 and second curved portion 264 orient first flat seal portion 242 and second flat seal portion 266 parallel to each other. The flat profile of first flat seal portion 242 and second flat seal portion 266 create a friction seal when first flat seal portion 242 is pressed against second flat seal portion 266 when first duct 202 and second duct 204 are joined together.

As discussed above, first curved portion 240 and second curved portion 264 each have a curved profile that orients first flat seal portion 242 and second flat seal portion 266 to create a seal. The curved profiles of first curved portion 240 and second curved portion 264 also provide a surface for coupling 206 to clamp onto first duct flange 222 and second duct flange 224 to create a seal. Specifically, first curved portion 240 includes a first outer surface 278, and second curved portion 264 includes a second outer surface 280. First outer surface 278 and second outer surface 280 are configured to be received within coupling 206 such that coupling 206 clamps down on first duct flange 222 and second duct flange 224 to create a seal therebetween and couples first duct 202 to second duct 204.

Figure 4:
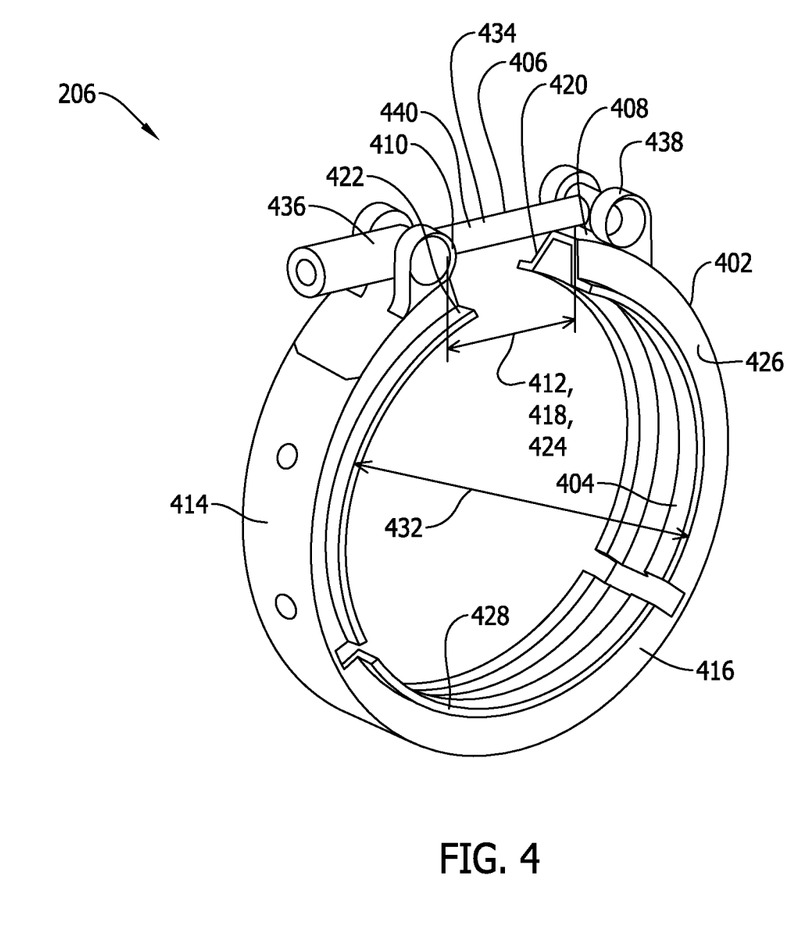
FIG. 4 is a perspective view of a coupling for securing the duct manifold shown in FIG. 2.

FIG. 4 is a perspective view of coupling 206. Coupling 206 is configured to couple first duct 202 to second duct 204 and to create a seal between first duct flange 222 and second duct flange 224. In the illustrated example, coupling 206 is a clamp with a cupped retaining band or a V-band clamp. However, coupling 206 may be any type of clamp or coupling device that enables duct manifold 108 to operate as described herein. In the illustrated implementation, coupling 206 includes a band 402, a V-clamp 404, and a tightening mechanism 406. V-clamp 404 is coupled to band 402, and tightening mechanism 406 is coupled to band 402.

In the illustrated implementation, band 402 is a flat strip of metal formed into a loop. Band 402 includes a first end 408, a second end 410, and a band gap 412 defined between first end 408 of band 402 and second end 410 of band 402. Band 402 also includes an outer surface 414 and an inner surface 416 opposite outer surface 414. Band 402 is formed into a partial loop such that band gap 412 defines a non-clamped distance 418 when coupling 206 is not clamping first duct 202 and second duct 204. Non-clamped distance 418 is configured to be large enough to allow coupling 206 to be placed around first duct flange 222 and second duct flange 224 such that coupling 206 circumscribes first duct flange 222 and second duct flange 224, but not so large that tightening mechanism 406 cannot clamp first duct flange 222 and second duct flange 224 to create an airtight seal therebetween.

In the illustrated implementation, V-clamp 404 is a curved strip of metal formed into a loop. V-clamp 404 includes a first end 420, a second end 422, and a V-clamp gap 424 defined between first end 420 of V-clamp 404 and second end 422 of V-clamp 404. V-clamp 404 also includes an outer surface 426 and an inner surface 428 opposite outer surface 426. V-clamp 404 is formed into a partial loop such that V-clamp gap 424 also defines non-clamped distance 418 when coupling 206 is not clamping first duct 202 and second duct 204. V-clamp 404 is a cupped, metal retaining band formed into a loop or a V-shaped strip of metal formed into a loop. V-clamp 404 is shaped such that V-clamp 404 defines a flange reception volume 430 configured to receive first duct flange 222 and second duct flange 224. Specifically, inner surface 428 of V-clamp 404 presses first outer surface 278 and second outer surface 280 when first duct flange 222 and second duct flange 224 are positioned within flange reception volume 430. Outer surface 426 of V-clamp 404 is coupled to inner surface 416 of band 402 such that band 402 circumscribes V-clamp 404. Together band 402 and V-clamp 404 define a coupling diameter 432.

Tightening mechanism 406 is configured to adjust coupling diameter 432 by adjusting band gap 412 and V-clamp gap 424. In the illustrated implementation, tightening mechanism 406 is a screw tightening mechanism. However, tightening mechanism 406 may be any type of tightening device configured to adjust coupling diameter 432 by adjusting band gap 412 and V-clamp gap 424. In the illustrated implementation, tightening mechanism 406 includes a screw 434 coupled to outer surface 414 of band 402 at first end 408 of band 402 and a receiving nut 436 coupled to outer surface 414 of band 402 at second end 410 of band 402. Screw 434 includes a head end 438 and a threaded end 440 opposite head end 438. Head end 438 is pivotably coupled to outer surface 414 of band 402 at first end 408 of band 402, and receiving nut 436 is pivotably coupled to outer surface 414 of band 402 at second end 410 of band 402. Pivotably coupling screw 434 and receiving nut 436 to band 402 allows for flexibly aligning screw 434 and receiving nut 436 during installation of duct manifold 108. Screw 434 is configured to be received into receiving nut 436. Screw 434 is also configured to be rotated such that receiving nut 436 is threaded onto threaded end 440 and pulled toward head end 438. Pulling receiving nut 436 toward head end 438 pulls second end 410 of band 402 and second end 422 of V-clamp 404 toward first end 408 of band 402 and first end 420 of V-clamp 404.

During operations, first duct 202 and second duct 204 are brought in close proximity to each other. Second duct 204 is positioned relative to first duct 202 such that second duct flange 224 rests on flange support 276. Specifically, second duct 204 is positioned relative to first duct 202 such that second end 274 of second flat seal portion 266 rests on flange support 276. Resting second duct flange 224 on flange support 276 ensures that first duct body 208 and second duct body 214 are aligned such that first center line 210 and second center line 216 are aligned. As such, flange support 276 allows first duct body 208 to be self-aligned with second duct body 214 such that a single installer can align first duct body 208 with second duct body 214.

Coupling 206 is then installed on first duct flange 222 and second duct flange 224. Specifically, first end 408 of band 402 and first end 420 of V-clamp 404 are pulled away from second end 410 of band 402 and second end 422 of V-clamp 404 such that band gap 412 and V-clamp gap 424 increase in length. First duct 202 and second duct 204 are inserted into increased length band gap 412 and V-clamp gap 424. First duct 202 and second duct 204 are inserted into coupling 206 such that first duct flange 222 and second duct flange 224 are inserted into flange reception volume 430. Specifically, first duct 202 and second duct 204 are inserted into coupling 206 such that inner surface 428 of V-clamp 404 presses first outer surface 278 and second outer surface 280 of first duct flange 222 and second duct flange 224 respectively.

First end 408 of band 402 and first end 420 of V-clamp 404 are then pulled toward second end 410 of band 402 and second end 422 of V-clamp 404 such that band gap 412 and V-clamp gap 424 decrease in length. Screw 434 is inserted into receiving nut 436 and is rotated such that receiving nut 436 is threaded onto threaded end 440 of screw 434 and pulled toward head end 438 of screw 434. As receiving nut 436 is threaded onto screw 434, band gap 412 and V-clamp gap 424 decrease in length, and V-clamp 404 presses first flat seal portion 242 against second flat seal portion 266 creating a substantially air tight seal and coupling first duct 202 to second duct 204.

Resting second duct flange 224 on flange support 276 allows a single installer to align and install duct manifold 108 in tight spaces and close confines within vehicle 100. Specifically, resting second duct flange 224 on flange support 276 allows a single installer to align first duct 202 and second duct 204, and allows aligned first duct 202 and second duct 204 to rest in place while the installer places coupling 206 around first duct 202 and second duct 204. The installer's hands are then free to tighten coupling 206, creating an air tight seal around first duct 202 and second duct 204. As such, flange support 276 and the shape of second duct flange 224 allows first duct 202 to self-align with second duct 204 and allows a single installer to install duct manifold 108. Accordingly, the structure and configuration of first duct 202 and second duct 204 as described above properly align first duct 202 and second duct 204 and free an installer's hands such that the installer can complete the entire installation process alone.

Figure 5:
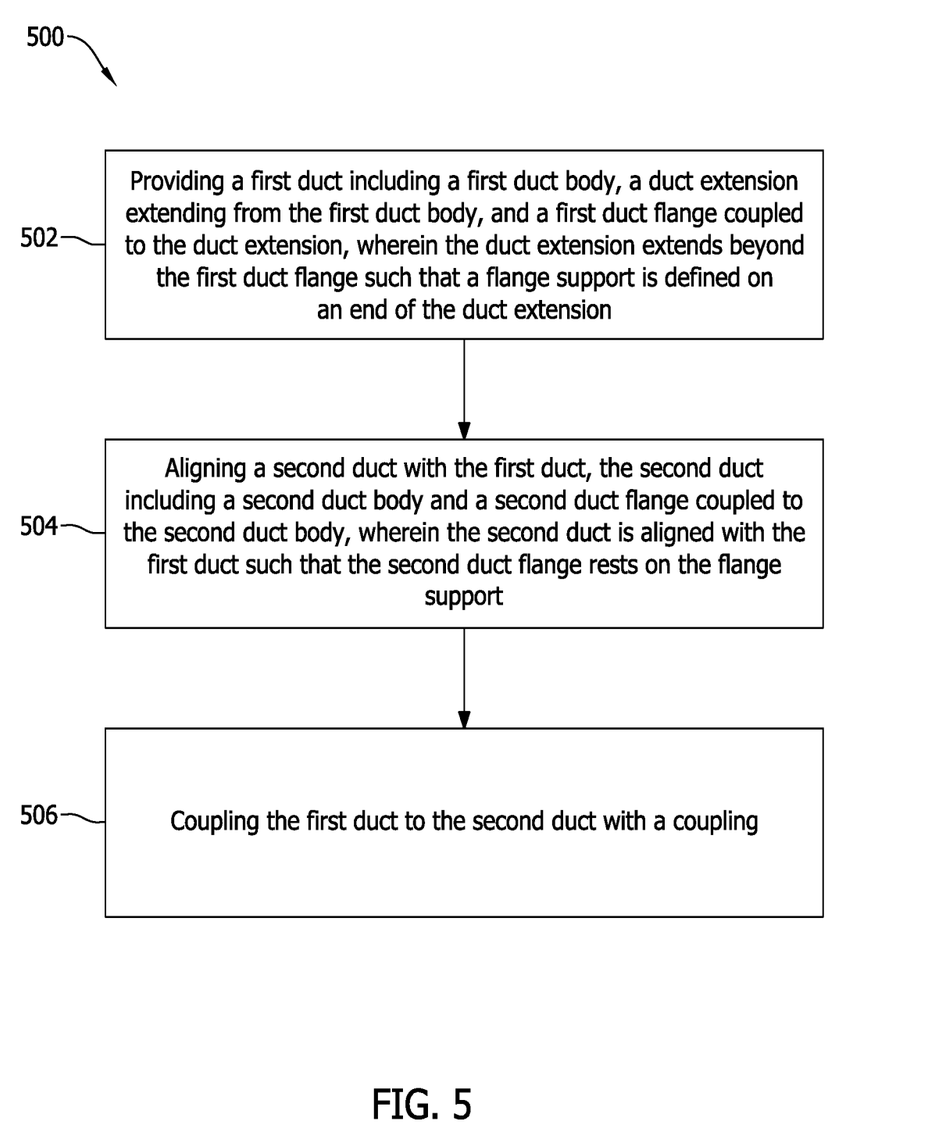
FIG. 5 is a flow diagram of an example of a method of constructing a duct manifold.

FIG. 5 is a flow diagram of an example of a method 500 of constructing duct manifold 108. Method 500 includes providing 502 first duct 202 including first duct body 208, first duct extension 220 extending from first duct body 208, and first duct flange 222 coupled to first duct extension 220. First duct extension 220 extends beyond first duct flange 222 such that flange support 276 is defined on second end 230 of first duct extension 220. Method 500 also includes aligning 504 second duct 204 with first duct 202. Second duct 204 including second duct body 214 and second duct flange 224 coupled to second duct body 214. Second duct 204 is aligned with first duct 202 such that second duct flange 224 rests on flange support 276. Method 500 further includes coupling 506 first duct 202 to second duct 204 with coupling 206.

Method 500 may also include placing coupling 206 around first duct flange 222 and second duct flange 224. Method 500 may also include tightening coupling 206 to form a seal between first duct flange 222 and second duct flange 224. Method 500 may also include seam welding first duct flange 222 to first duct extension 220.

The above described examples of the systems and methods described herein include a duct manifold including a first duct and a second duct coupled together by a coupling. The first duct includes a first duct extension and a first duct flange coupled to the first duct extension. The first duct extension extends beyond the first duct flange such that a flange support is defined on the first duct extension. The second duct includes a second duct flange coupled to the second duct. The first and second duct flanges each include a skirt and an apex. The skirt is a flat metal portion, and the apex is a curved metal portion coupled to an end of the skirt. The curved metal shape of the apex forms a first flat seal portion on the first duct flange and a second flat seal portion on the second duct flange. During installation, a single installer rests the second flat seal portion on the first duct extension such that the first and second flat seal portions are pressed against each other. Resting the second duct flange on the flange support allows the installer to install the duct manifold in tight spaces and close confines within a vehicle. Specifically, resting the second duct flange on the flange support allows the installer to align the first duct and the second duct, and allows the aligned first and second ducts to rest in place while the installer places the coupling around the first and second ducts. The installer's hands are then free to tighten the coupling, creating an air tight seal around the first and second ducts. As such, the structure and configuration of the first and second ducts properly aligns the first and second ducts and frees an installer's hands such that the installer can complete the entire installation process alone.

The systems and methods described herein are not limited to the specific examples described herein, but rather, components of the systems and/or steps of the methods may be utilized independently and separately from other components and/or steps described herein.

Although specific features of various examples of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct manifold comprising: a first duct comprising: a first duct body; a duct extension extending from the first duct body; and a first duct flange coupled to the duct extension, the first duct flange comprising a first skirt at a first end thereof, and a first flat seal portion at a second end thereof, wherein the duct extension extends beyond the first duct flange such that a flange support is defined on an end of the duct extension; a second duct comprising: a second duct body; and a second duct flange coupled to the second duct body, the second duct flange comprising a second skirt at a first end thereof, and a second flat seal portion at a second end thereof; and a coupling configured to couple the first duct to the second duct, wherein the second duct flange rests on the flange support when the coupling couples the first duct to the second duct, wherein the duct extension is positioned radially inward of the first skirt, the first flat seal portion, and the second flat seal portion, and wherein the second duct flange is coupled to an end of the second duct body such that inner diameters of the second skirt, the second duct, and the duct extension are all longitudinally aligned with each other.

2. The duct manifold of claim 1, wherein the coupling comprises a V-band clamp.

3. The duct manifold of claim 2, wherein the V-band clamp comprises a band, a V-clamp, and a tightening mechanism, wherein the V-clamp is coupled to the band and the tightening mechanism is coupled to the band.

4. The duct manifold of claim 3, wherein the band comprises a strip of metal formed into a loop with a band gap between a first end of the strip of metal and a second end of the strip of metal, the strip of metal has an outer surface and an inner surface, the V-clamp comprises a V-shaped strip of metal formed into a loop with a V-clamp gap between a first end of the V-shaped strip of metal and a second end of the V-shaped strip of metal, wherein the V-clamp is coupled to the inner surface of the band.

5. The duct manifold of claim 4, wherein the tightening mechanism is configured to adjust a coupling diameter by adjusting the band gap and the V-clamp gap.

6. The duct manifold of claim 5, wherein the tightening mechanism is a screw tightening mechanism comprising a screw coupled to the first end of the band and a receiving nut coupled to the second end of the band, wherein the screw is configured to be received into the receiving nut and to pull the second end of the band toward the first end of the band.

7. The duct manifold of claim 4, wherein the first duct flange comprises the first skirt and a first apex, the first skirt has a first end and a second end, the first apex is coupled to the second end of the first skirt, the second duct flange comprises the second skirt and a second apex, the second skirt has a first end and a second end, the second apex is coupled to the second end of the second skirt.

8. The duct manifold of claim 7, wherein the first apex comprises a first curved portion and the first flat seal portion and the second apex comprises a second curved portion and the second flat seal portion, wherein the first flat seal portion abuts the second flat seal portion forming a seal when the coupling couples the first duct to the second duct.

9. The duct manifold of claim 8, wherein the first skirt is coupled to the duct extension and the second skirt is coupled to the end of the second duct body.

10. The duct manifold of claim 9, wherein the first skirt is seam welded to the duct extension and the second skirt is butt welded to the end of the second duct body.

11. The duct manifold of claim 8, wherein the first curved portion, the first flat seal portion, the second curved portion, and the second flat seal portion are positioned within the V-clamp when the coupling couples the first duct to the second duct.

12. A duct manifold comprising: a first duct comprising: a first duct body; a duct extension extending from the first duct body; and a first duct flange coupled to the duct extension, the first duct flange comprising a first skirt at a first end thereof, and a first flat seal portion at a second end thereof, wherein the duct extension extends beyond the first duct flange such that a flange support is defined on an end of the duct extension; a second duct comprising: a second duct body; and a second duct flange coupled to the second duct body, the second duct flange comprising a second skirt at a first end thereof, and a second flat seal portion at a second end thereof; and a coupling configured to couple the first duct to the second duct, wherein the second duct flange rests on the flange support when the coupling couples the first duct to the second duct, wherein the duct extension is positioned radially inward of the first skirt, the first flat seal portion, and the second flat seal portion, and wherein the second skirt, the second duct, and the duct extension are all longitudinally aligned with each other, and the second skirt and second duct are welded together.

13. The duct manifold of claim 12, wherein the first duct flange and the second duct flange each comprise a skirt and an apex, the skirts having a first end and a second end, the apexes coupled to the respective second ends of the skirts.

14. The duct manifold of claim 13, wherein each apex comprises a curved portion and one of the first or second flat seal portions.

15. The duct manifold of claim 14, wherein each skirt is coupled to the duct extension.

16. The duct manifold of claim 15, wherein the first skirt is seam welded to the duct extension.

* * * * *